United States Patent [19]

Miyata et al.

[11] Patent Number: 5,018,617
[45] Date of Patent: May 28, 1991

[54] WORKPIECE PALLET CHANGER FOR MACHINE TOOLS

[75] Inventors: Ichiro Miyata; Ichiro Kitaura; Keitaro Yonezawa, all of Itamishi, Japan

[73] Assignee: Aioi Seiki Kabushiki Kaisha, Hyogoken, Japan

[21] Appl. No.: 501,404

[22] Filed: Mar. 23, 1990

Related U.S. Application Data

[63] Continuation of Ser. No. 634,406, Jul. 25, 1984, abandoned.

[30] Foreign Application Priority Data

Jul. 25, 1983 [JP] Japan ............... 58-136363

[51] Int. Cl.$^5$ .............................................. B65G 37/00
[52] U.S. Cl. ......................... 198/346.1; 198/465.1; 29/33 P
[58] Field of Search ............. 198/345, 346.1, 465.1, 198/404, 408, 345.3; 29/33 P, 563

[56] References Cited

U.S. PATENT DOCUMENTS

| | | | |
|---|---|---|---|
| 2,139,403 | 12/1938 | Cole | 29/33 P |
| 3,628,448 | 12/1971 | Boer | 198/339 X |
| 3,854,613 | 12/1974 | Renfrow | 198/404 X |
| 4,014,428 | 3/1977 | Ossbahr | 198/345 |
| 4,090,287 | 5/1978 | Selander | 29/563 X |
| 4,119,108 | 10/1978 | Alexander | 198/404 X |
| 4,237,598 | 12/1980 | Williamson | 29/563 X |
| 4,452,561 | 6/1984 | Forte | 198/404 X |
| 4,480,738 | 11/1984 | Mattson | 29/563 X |
| 4,498,571 | 2/1985 | Nomura et al. | 198/472 X |
| 4,583,631 | 4/1986 | Yonezawa et al. | 198/345 |

FOREIGN PATENT DOCUMENTS

| | | | |
|---|---|---|---|
| 55-112753 | 8/1980 | Japan | 29/563 |
| 223553 | 12/1983 | Japan | 198/346.1 |

Primary Examiner—Joseph E. Valenza
Attorney, Agent, or Firm—Lowe, Price, LeBlanc, Becker & Shur

[57] ABSTRACT

The present invention relates to a workpiece pallet changer which changes a work pallet fitted on a pallet positioning device on the table of a machine tool. The changer comprises a moveable pallet mounting assembly disposed at plural locations along the peripheral surface of a rotatable frame, each of which engages a work pallet to permit transfer of the work pallet between the pallet mounting assembly located on the surface of the rotatable frame and the pallet positioning device, while simultaneously allowing chips fall automatically from the work pallet as it rotates downward.

13 Claims, 7 Drawing Sheets

WORKPIECE PALLET CHANGER FOR MACHINE TOOLS

This application is a continuation of application No. 06/634,406, filed July 25, 1984, now abandoned.

BACKGROUND OF THE INVENTION

1. Field of the Invention

The present invention relates to a work pallet changer for machine tools such as a vertical or horizontal machining center, a milling machine, a planer, a shaper, a boring machine or a drilling machine, and is adopted to change the work pallet on the operation table of such a machine tool.

2. Description of the Prior Art

In recent years, machine tools have had to improve their operational efficiency as their power, speed and cost prices are increased.

Therefore, this invention is intended to reduce the down time of a machine tool during the work changing process using work pallets on which one or more workpieces are fixed. That is, one or more workpieces are fixed on or removed from a work pallet outside the machine tool while the operation of the machine tool continues. Then, after the machining operation is finished, the workpieces and the associated pallets will be changed by means of the work pallet changer.

The work pallet changer for machine tools is basically comprised as follows:

A pallet fixing device is provided on the work table of a machine tool so as to support and position a work pallet. A pallet shifting system, located in front of the machine tool, comprises a plurality of pallet mounting parts, each of which is moved between a pallet-changing position in front of the pallet-positioning device and a retracted position remote from the pallet-changing position. Each pallet is moved between the pallet mounting part located at pallet-changing position and the pallet positioning device.

Figures 30, 31, 32, 33:
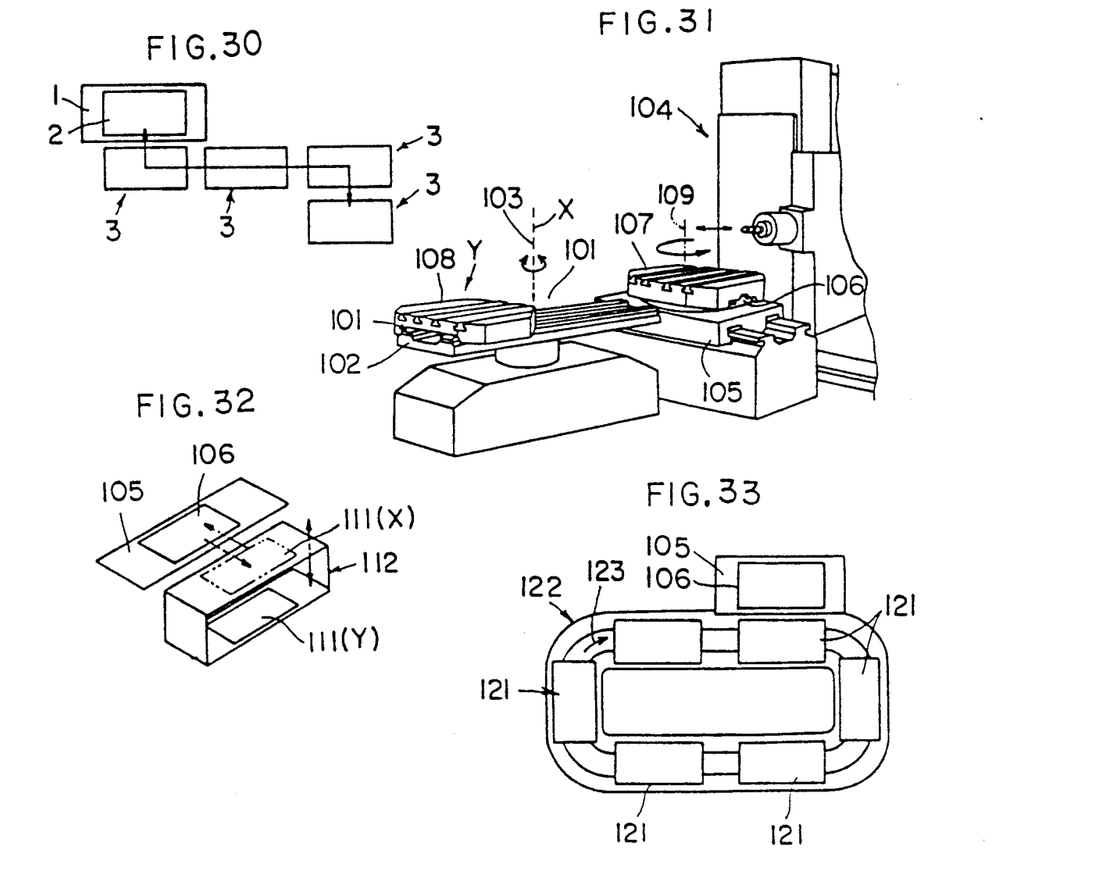
FIG. 31 is a perspective view of a horizontally rotating type.
FIG. 32 is a schematic perspective view of an elevation type.
FIG. 33 is a schematic plan view of a horizontally rotating conveyor type.

In this basic arrangement, there are several types of known mechanisms for moving each pallet-mounting part between the pallet-changing position and the retracted position, including: I. A horizontally rotating type of the type disclosed in U.S. Pat. No. 4,090,287, as shown herein in FIG. 31 (Prior Art I). As depicted in that figure, two pallet mounting locations 101 are disposed on the front side and rear side, respectively, of a rotary table 102. The rotary table 102 can be rotated about its central vertical axis 103 in a horizontal plane by a half revolution. Besides the pallet-positioning device 106 is supported for rotation in a horizontal plane around a vertical axis 109 above the table 105 of the machine tool 104. Initially, a work pallet 107 holding finished workpieces is moved from the pallet-positioning device 106 to a pallet-mounting location 101 that is positioned in a pallet-changing station X on the rotary table 102. The rotary table 102 is then turned a half a revolution, so that the work pallet 107 holding the finished workpieces is moved to the retracted position Y and another work pallet 108 holding unfinished workpieces is moved to the pallet-changing station X. Next, the changing of work-pallets 107 and 108 on the table 105 is completed by moving the work pallet 108 holding the unfinished workpieces from the pallet-changing station X to the pallet-positioning device 106. II. An elevation type as shown in FIG. 32 (Prior Art II) wherein two pallet-mounting elements 111 properly separated from each other in a vertical direction are disposed on the top wall part and the bottom wall part of an elevating frame 112. III. A horizontally rotating conveyance type as shown in FIG. 33 (Prior Art III) wherein six pallet mounting elements 121 are disposed along a conveyer line 123 of a horizontal rotating conveyer 122 in spaced relation.

However, the prior art discussed above has various disadvantages. Specifically, in the horizontally rotating type shown as Prior Art I and the horizontally rotating conveyance type shown as Prior Art III, a plurality of pallet-mounting parts are disposed in side-by-side relation in a horizontal plane, and an excessively large space is required for their revolution or circulation, so that a larger area is required to fit the pallet-changer in the space in front of the machine tool.

In case of elevation type shown as Prior Art II, the workpiece changing operation at the lower pallet-mounting part is inefficient because both the right and the left side walls of the elevation frame 112 interfere with the operation. In order to improve the efficiency of this pallet changing operation, the distance between these side walls must be expanded laterally beyond the width of the work pallet requiring the elevation frame to be made larger and heavier, and the drive system for elevating the heavy frame must be larger and more powerful, with more power consumption.

In either of the horizontally rotating types of prior art, the elevation type or the horizontal circular conveyance type, removal of chips is difficult and can make work conditions bad, because the chips must be swept out, washed out or blown out from above the upper surface of the work pallet.

Furthermore, in order to improve the efficiency of chip-removing operation, it is sometimes required that a chip removing system also be installed at different stages, to insure removal of chips from the work pallet. In the latter case, a chip-removing system and an extensive conveyor are a necessary addition that is expensive, and requires excessive space for installation. Moreover, the time and labor required by a double-trip conveyance of the work pallet between the pallet changer and the chip-removing system is excessively difficult.

SUMMARY OF THE INVENTION

Therefore, the present invention is intended to obviate all of the foregoing disadvantages of these prior arts described above. Specifically, the first primary object of the present invention is to reduce the space required for the work pallet changer, and a second object of the present invention is to make the work pallet changer more compact and require less power to operate. A third object of the present invention is to remove chips easily and efficiently from the work pallet, and thereby improve work conditions. A fourth object of the present invention is to avoid the installation of additional apparatus for removing chips, i.e., individual chip removing apparatus and extensions of the conveyor system.

In order to accomplish these objects, the work pallet changer for machine tools according to the present invention comprises a particular arrangement for moving the pallet-mounting parts between a pallet-changing position and a retracted position, as described in more detail. The pallet shifting device comprises a pallet rotating system including a rotatable frame, a supporting frame, drive means for rotating the rotatable frame and engaging means for engaging pallets on the rotary frame. The rotatable frame is supported for rotation about a horizontal axis by the supporting frame, and is rotated by the drive means. Each pallet mounting part is disposed on a supporting surface of the rotatable frame at a plurality of places, with the engaging means associated therewith so as to make it possible to engage each workpiece pallet thereon.

The pallet changer according to the present invention, therefore, results in the following advantages.

i. The necessary planar area for installation of the pallet rotating system according to the present invention may be remarkably small in comparison with the prior art arrangements in which pallet mounting parts are disposed in a single horizontal plane, because the pallet-mounting means according to the present invention are concentrated about the peripheral surface of the rotatable frame of the pallet rotating system. Since the area for installation is so small, the layout of a factory is convenient and economical. Moreover, the present invention makes it possible to install the pallet rotating system within a narrow space in front of a machine tool that is already installed.

ii. Each pallet mounting part may be made small in size without extending out sidewards, and there is no disturbance of the work change operation. Also, the drive means may be small for a well-balanced rotation of the rotatable frame and the workpiece pallets, and the consumption of power may also be small because of the rotary drive.

iii. Chips from the workpieces are automatically and efficiently removed by letting them fall from the work pallet engaged on the pallet mounting means while the pallet mounting means is turned toward downward during rotation. In this case, a chip-washing system is easily disposed under the rotary frame, and it is preferable to wash chips from the work pallet quickly and cleanly by this washing system.

iv. During rotation of the rotatable frame for changing the position of the work pallet, chips are automatically removed by gravity, so that a separate chip removing system and an additional conveyor needed to carry each work pallet to and from a separate chip-removing system station is unnecessary, thus saving expense and installation space. Moreover, the time and labor required by a two trip conveyor system is also saved.

v. Furthermore, if the reciprocating system for pushing and pulling the work pallet between the pallet-mounting means located at the pallet-changing position and the pallet-positioning device is provided, and if at least a drive means for the reciprocating system is disposed outside of the rotatable frame, the mechanism may be simplified in comparison with arrangements where reciprocating systems are provided for each pallet mounting means because the drive means is effective for any work pallet on any pallet-mounting means located thereon even though there is only one of them.

The present invention will be understood more clearly by reference to the following detailed description of the preferred embodiment in relation to the attached drawings.

BRIEF DESCRIPTION OF THE DRAWINGS

In the drawings, FIGS. 1 through 9 relate to the first preferred embodiment of the present invention, wherein:

FIGS. 15 through 19 depict the second preferred embodiment, wherein:

FIGS. 24 through 27 illustrate the third preferred embodiment, wherein:

FIGS. 28 through 30 depict various modifications of the third preferred embodiment, wherein:

FIGS. 31 through 33 depict the workpiece pallet changers according to various prior art, wherein:

DETAILED DESCRIPTION OF THE PREFERRED EMBODIMENT

The First Preferred Embodiment

Referring now to FIGS. 1-5, a pallet-positioning device 2 is fastened on the work table 1 of a vertical machining tool M, and a pallet-rotating mechanism 3 is disposed in front of the machine tool M, as the pallet shifting system, so as to accomplish the workpiece changing operation for the machine tool M by means of a two-way transfer of the workpiece pallet 4 between the pallet positioning device 2 and the pallet-rotating mechanism 3.

The pallet-positioning device comprises a clamp system 10 including a pair of right and left-hand stops 11. The clamp system 10 comprises a base plate 5, on which are mounted a pair of right-hand and left-hand rails 6, a pair of hydraulic fitting plugs 7 which may be fitted in recesses formed in the bottom of a workpiece pallet 4 to fix the position of the workpiece pallet 4, a guide rail 8 which guides the workpiece pallet 4 by fitting slidably within a guide groove 36 formed in the bottom of the workpiece pallet 4, a set of six supporting blocks 9 which support the workpiece pallet 4 horizontally, and clamping parts formed in flange-like shape mounted individually at the ends of piston rods of vertical hydraulic cylinders associated with each supporting block 9. The pallet fixing device 2 may be associated bodily with the table 1.

Figure 1:
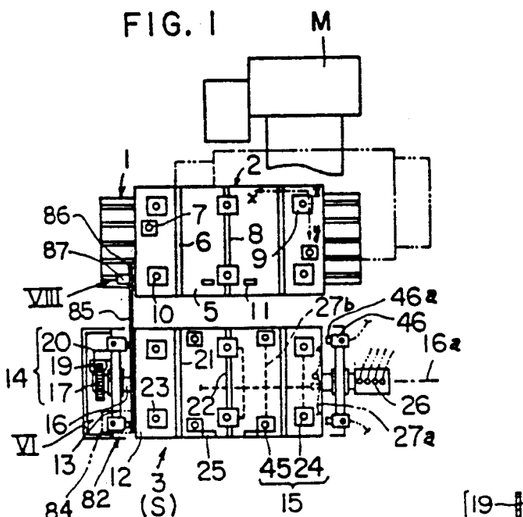
FIG. 1 is a plan view of a workpiece pallet changer in accordance with a first preferred embodiment disposed in front of a machine tool.

The pallet rotating mechanism 3 is positioned in front of the table 1 which is located at the initial setting position (shown in full lines in FIG. 1). This mechanism 3 comprises a rotatable frame 12, a support 13, a set of pallet clamping devices 15, a locking device 46 for locking the rotatable frame 12, a push-pull system 82 to move a work pallet horizontally, a hydraulic power system (not shown) and a control means (also not shown). In the lower part of the pallet rotating mechanism 3, a chip washing system W is disposed.

The rotatable frame 12 is made from steel sheets formed in a box-like configuration to attain sufficient strength and lightness. It comprises two pallet mounting surfaces 12a on the top and the bottom surfaces thereof and a pair of supporting axle shafts 16 project from the center of the right and left wall surfaces thereof for rotatably supporting the rotatable frame 12 on its support 13. The horizontal axis of rotation 16a passes through the center the rotatable frame 12 and lies parallel with the X axis (disposed from right to left) in the coordinates of the machine tool M. Alternatively, the rotary frame 12 may be made from steel bars and/or sheets to form a skeletal frame or from a thick steel plate.

When the rotary frame 12 is rotated by the drive means 14, each pallet mounting part 12A changes its position between the pallet-changing position X located in front of the pallet-positioning device 2, and a retracted position Y directly below pallet changing position X.

The drive means 14 comprises a pinion 17 disposed on the outer end of one supporting shaft 16, a rack 19 connected to the piston rod of a vertically installed hydraulic cylinder 18 which engages the pinion 17. A guide frame 20 keeps the rack 19 in engagement, and the drive means 14 imparts a reversible movement of the rotatable frame 12 through one half a revolution on its X axis.

Figures 9, 10, 11:
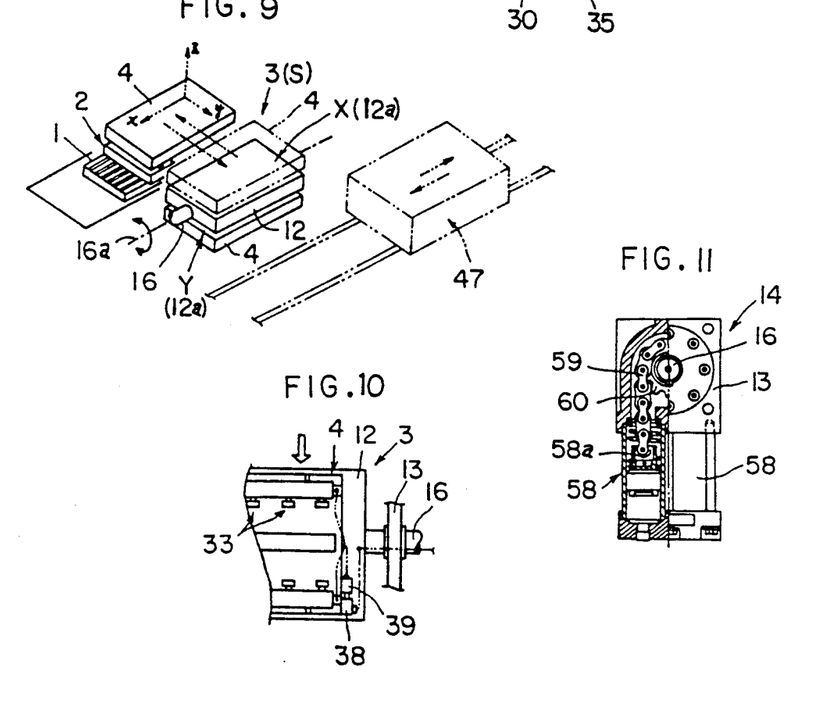
FIG. 9 is a schematic perspective view of a portion of the embodiment shown in FIG. 1, depicting also a pallet conveyor bogie.
FIG. 10 is a fragmentary plan view of certain important portions employed in a first modified embodiment of the pallet revolving system used in the first preferred embodiment.
FIG. 11 is a partially sectional side elevation of a drive means for rotating the rotary frame.

The drive means 14 may comprise an electric, pneumatic or hydraulic motor and any desired transmission system such as sprockets and chains, or pulleys and belts, or a reduction gear train. The motor may also be of the oscillating type or comprise an arrangement of pneumatic or hydraulic cylinders. For example, as shown in FIG. 11, the drive means 14 may comprise two hydraulic cylinders 58, and chains 59 which are connected at either end to the piston rods 58A of both cylinders 58 and trained over a drive sprocket 60, so as to make the drive means 14 operate with significant torque. Of course, various other known power systems may be used as the drive means in the present invention. Where the workpiece pallets 4 are small, a manual drive means may be adopted to drive the rotatable frame 12.

On both the top and bottom surfaces of the rotatable frame 12, pallet-mounting surfaces 12a are provided with an engaging mechanism 15 and a pair of spaced stops 25. The engaging mechanism 15 comprises a pair of spaced, parallel rails 21, a guide rail 22 therebetween, six supporting blocks 23, six hydraulic pallet clamps 24 arranged in the same manner as the corresponding parts on the pallet-positioning device 2, and also four hydraulic fitting plugs 45.

In order to supply pressurized oil to the hydraulic pallet clamps 24 and the hydraulic work clamp 33 on the workpiece pallet 4, a rotary joint 26 is connected to the outer end of supporting shaft 16 and four lines of oil passages are led from hydraulic feed unit to the rotatable frame 12. Numeral 27a indicates the oil pressure line to the pallet-engaging system 15, and 27b designates the oil pressure line to the clamp frames 30 disposed on the front and rear sides of the workpiece pallet 4. The other oil pressure lines are provided for another pallet mounting part 12a in the same manner. It is possible to use a directional control valve so as to reduce the number of oil pressure lines passing through the rotary joint 26, or to connect long hydraulic hoses to the rotary frame directly, compensating for the rotation of the rotary frame 12 by the flexibility of hydraulic hoses and eliminating the need for the rotary joint 26. Furthermore, as shown in FIG. 10, it is preferable to locate the receiving part 38 of the self-sealing coupling on right hand end portion of each pallet mounting part 12a, and have it communicate with the oil pressure line passing through the rotary joint 26, and to have the corresponding inlet part 39 of the self-seal coupling on the right-hand end of each workpiece pallet 4 for communication with oil pressure lines leading to the work clamp 33, so as to effect an automatic coupling of the parts 38 and 39 when the workpiece pallet 4 is moved from the pallet-positioning device 2 to the pallet mounting surface 12a and stopped by the stops 25.

The pallet engaging mechanism 15 serves to prevent dropping of the workpiece pallet 4 while the rotatable frame 12 is rotated, and comprises clamps 24 and locating plugs 45 so that the locating plugs 45 fit into corresponding recesses formed in the bottom surface of the workpiece pallet 4, and to clamp the workpiece pallet 4 on the pallet-mounting part 12a after the workpiece pallet 4 is moved from the pallet-positioning device.

Instead of the pallet clamping mechanism 15, a system which comprises hydraulic cylinders with piston rods can be installed to fit into corresponding recesses formed horizontally on the right and left-hand end surfaces of the workpiece pallet 4, or bolts or pins may be adopted. Also, mechanical tightening or engaging means, vacuum or electromagnetic means, and electric pneumatic or hydraulic tightening or engaging motor means can also be substituted for the engaging system 15. Some of the other modified means which can be substituted will be described hereinafter.

A locking device 46 serves to lock the rotatable frame 12 after every half revolution thereof, and comprises each pair of front and rear hydraulic cylinders spaced horizontally on each right and left-hand sides of the supporting frame 13 so as to lock the rotary frame 12 by locking members 46a extending under the rotary frame 12 from the cylinders, after the desired rotation of the rotary frame 12.

Figure 4:
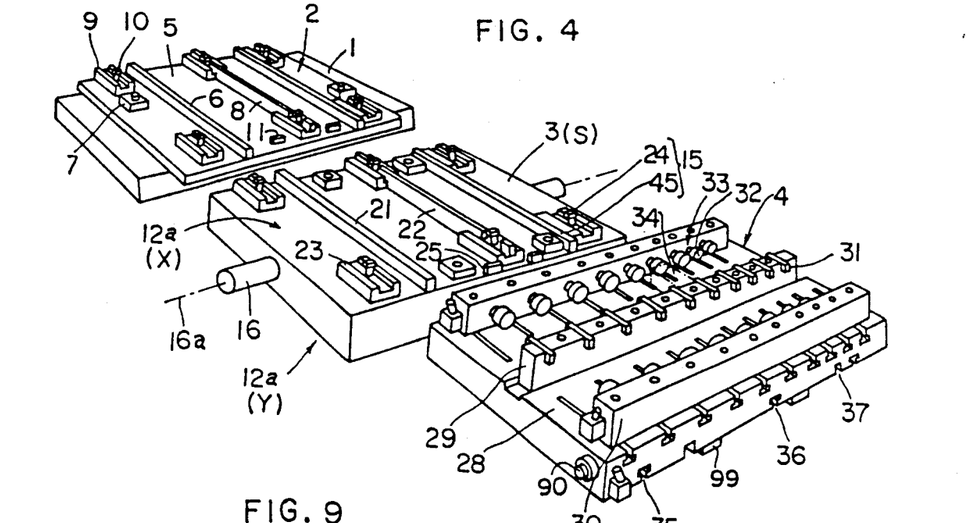
FIG. 4 is a perspective view of the certain important portions of the embodiment shown in FIG. 1, wherein the workpiece pallet 4 is shifted to one side of a rotary frame.
Figure 5:
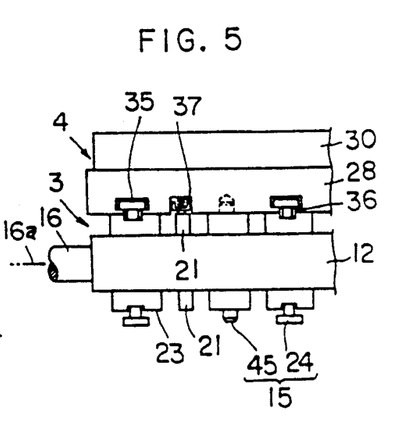
FIG. 5 is an enlarged fragmentary plan view of the portion indicated as V in FIG. 2.

As shown in FIGS. 4 and 5, each workpiece pallet 4 is provided with a base 28, an aligning member frame 29 positioned thereon, and a pair of clamp members 30 disposed front and rear of the aligning frame 29. The distance between each clamp members 30 and the aligning member 29 is preferably adjustable. Locators 31 are fixed on the top of the aligning member frame 29 at a predetermined position. The clamp members 32 are each connected to the end of the piston rod of each hydraulic cylinder associated in the clamp frame 30, and are disposed along the clamp frame 30 in a predetermined position in order to clamp various workpieces, as determined by their configuration, for engagement by each locator 31 and the aligning frame 29.

Three T-shaped grooves 35-37 are formed at the bottom side of the base 28 to permit the relative motion between the workpiece pallet 4 and clamping parts of the clamp system 10 or the clamps 24 of the clamp system 15 during horizontal movement of the workpiece pallet 4. The vertical portion of the central T-shaped groove 36 functions as the guide groove, cooperating with the aligned guide rails 8 and 22.

Travelling roller arrangements (not shown) can be mounted in the right and left square grooves 35 and 37 movable up and down. When the workpiece pallet 4 is released by the clamps 10 and/or 24, the travelling roller arrangements are lowered by spring means to extend the periphery of the travelling rollers below the surface 28 so that these rollers can travel on rails 6 and/or 21.

If the clamps 10 and 24 of the pallet-positioning device 2 and pallet rotating mechanism 3 are simplified in the manner described hereinafter, it is possible to omit T-shaped grooves 35 and 37 on the clamping surface 28. Also, by adoption of certain roller conveyor arrangements described below on the pallet-positioning device 2 and on each pallet mounting part 12a instead of the travelling roller arrangements, it is possible to eliminate the travelling roller arrangements on the work pallet.

Further, by disposing guide rails 8 and 22 for slidable contact with the end surfaces of the workpiece pallet 4 or on the member attached to the workpiece pallet 4, it is possible to omit the guide groove 36 of work pallet, and to simplify the construction of work pallet 4.

It would be clearly understood that the structure of work pallet is not limited to the aforementioned types, and that work pallet of various constructions may be used in the present invention.

A forward-and-reverse conveyor drive system 82 serves to move the workpiece pallet 4 by pushing or pulling it between the pallet-mounting part 12a located at pallet-changing position X and the pallet positioning device 2. This system 82, as shown in FIG. 1, comprises a steel belt 83, drive means 84, two guide rails 85 and 86 disposed before and behind, and a cylinder 87 for disengagement. At the left side of the rotatable frame 12, the drive means 84 is disposed in the front part of the supporting frame 13, and the front guide rail 85 is disposed on the middle part and rear part of the supporting frame 13. The rear guide rail 86 and the cylinder 87 are disposed on the table 1.

Figures 6, 7, 8:
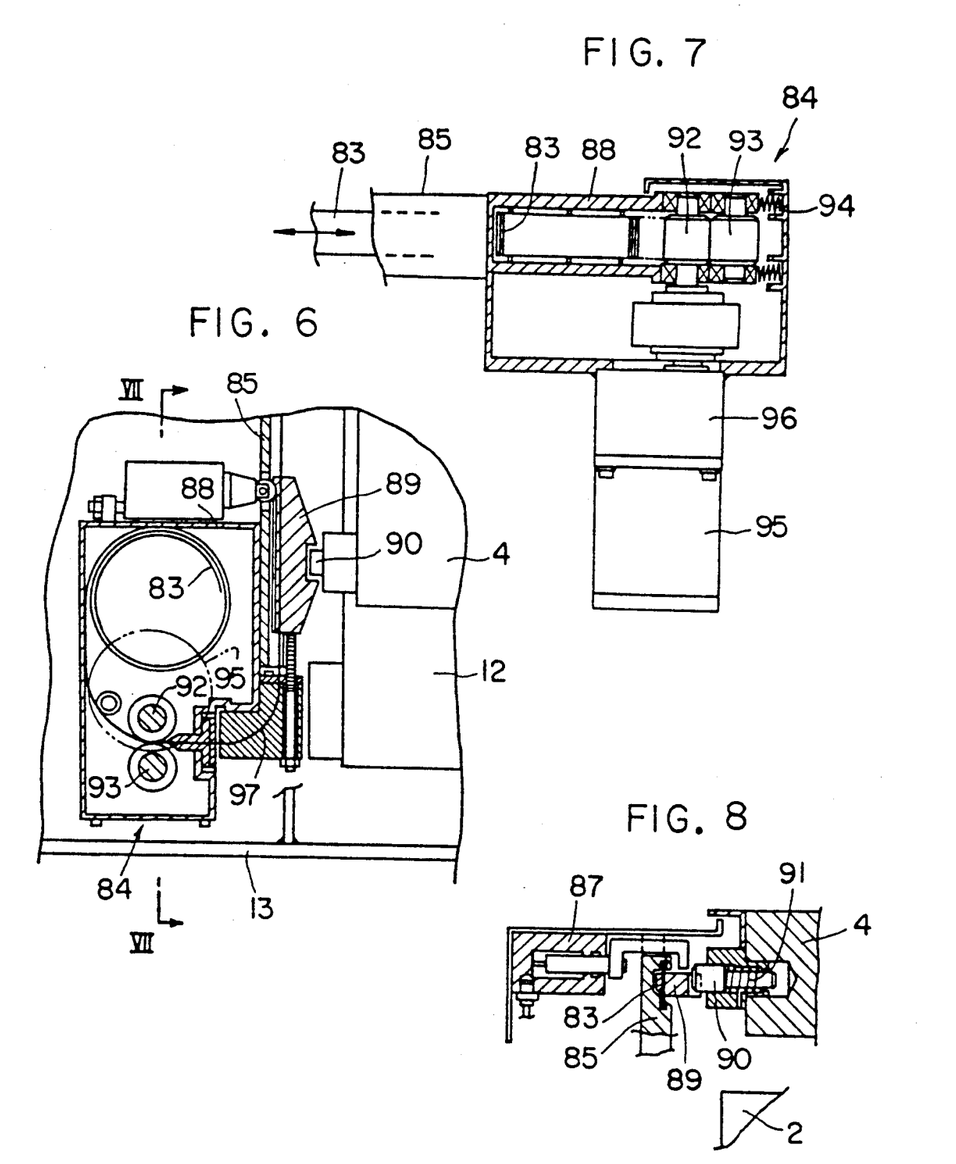
FIG. 6 is a horizontal cross-sectional view of the portion indicated as VI in FIG. 1.
FIG. 7 is a cross-sectional view taken on lines VII—VII of FIG. 6.
FIG. 8 is a fragmentary vertical sectional front view of the portion shown as VIII in FIG. 1.

The steel belt 83 is made from a spring steel and, as shown in FIG. 6, is helical in relaxed condition. The inner end of the helical spring is contained in the housing 88 of the drive means 84 and the other end passes through the guide rails 85 and 86 toward front and the rear. A connector 89 is fixed on the outer end of the steel belt 83. This connector 89 may be engaged by a pin 90 provided on the workpiece pallet 4 and biased outwardly by a spring 91 (shown in FIG. 8).

The drive means 84, as shown in FIGS. 6 and 7, comprises a drive roller 92 for driving the steel belt 83 and a pinch roller 93 which urges the belt 83 against the periphery of the drive roller 92 by the pressure of spring 94, a motor 95 with brake means, and a speed reduction mechanism 96. The steel belt 83 is extended and retracted back through a passage 97 by the motor 95 through the speed reduction mechanism 96 and the drive roller 92 so that it travels in the guide rails 85 and 86 to effect a reciprocating drive. Thus, by this reciprocating drive, the workpiece pallet 4 is pushed or pulled toward the rear or the front.

A hydraulic cylinder 87 for disengagement is shown in FIG. 8, and serves to move a pin 90 to the right toward the spring 91 so as to disengage the pin 90 from the connector 89, and to leave the workpiece pallet 4 in position on the pallet-positioning device 2.

Figure 2:
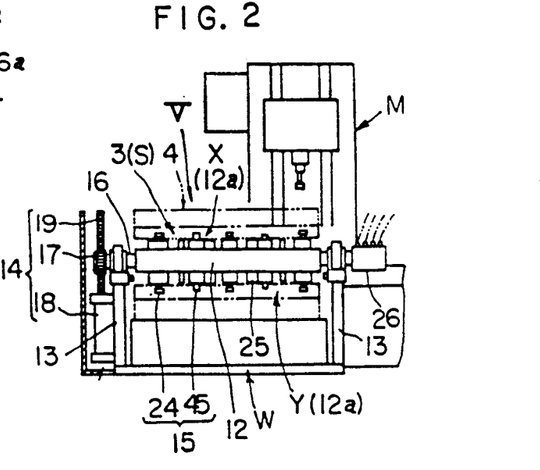
FIG. 2 is a front elevational view of the preferred embodiment of FIG. 1.
Figure 3:
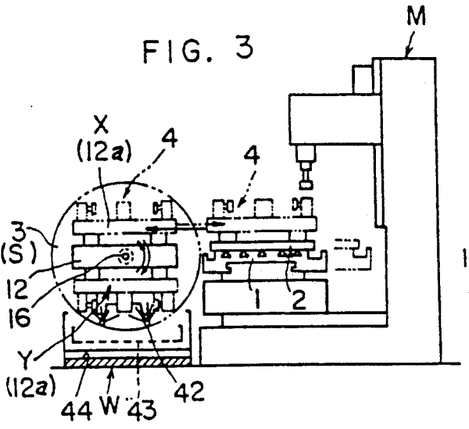
FIG. 3 is a side elevational view of the preferred embodiment of FIG. 1.

The chip washing system W, as shown in FIGS. 2 and 3, is provided for removing chips from workpiece pallet 4 and from workpieces thereon. It is disposed in the lower part of pallet rotating mechanism 3, and faces the bottom side of the workpiece pallet 4 which is in the retracted position Y without interfering with rotatable frame 12 or work pallets 4 when they are being rotated. This washing system can also be made to move up and down for the same purposes.

This system W has a plurality of jet nozzles 42 disposed in a plurality of lines in the upper part, a chip receiving box 43 in the middle part, and a reserve tank 44 for cleaning liquid in the lower part thereof. It also uses another system, which is not shown in the drawings, for pressurizing and supplying a cleaning liquid. The cleaning liquid, either the same as or different from the cutting fluid, is pressurized and fed from the tank 44 to the nozzles 42 by the system referred to, and then sprayed toward the work pallet 4 and the workpieces thereon so as to wash chips therefrom and to collecting these chips in the chip-receiving box 43, while collecting the cleaning liquid in the reserve tank 44. The washing system W may be fixed to the supporting frame 13 or made as a movable unit. Further, a mesh belt conveyor for carrying chips away may be provided instead of the chip receiving box 43. It is intended to collect workpieces 34 from the washing system W after the cleaning operation.

The operation of changing the workpiece pallets 4 by means of the workpiece pallet changer according to the present invention is as follows.

While a workpiece pallet 4 is clamped on the pallet-positioning device 2 for machining the workpieces held thereon, unfinished workpieces 34 are positioned and clamped on another workpiece pallet 4 located at the pallet-changing position X for preparation. Then, the rotary frame 12 is rotated a half a revolution so as to move loaded workpiece pallet 4 to the retracted position Y and to move an empty pallet mounting part 12A to pallet changing position X. After this rotation, the rotatable frame 12 is locked in position by the locking device 46.

After machining of the workpieces on work pallet 4 on table 1 is completed, fitting plugs 7 are disengaged and the clamp system 10 is released at the same time. Then, the work pallet 4 with the finished workpieces is moved onto the empty pallet-mounting part 12a by means of the reciprocating system 82. When the engaging members 99 are disposed to extend from the bottom of the workpiece pallet 4 and are received by stops 25, clamps 24 are actuated to fix this workpiece pallet 4 about the supporting frame 23. At the same time, locating plugs 45 are fitted into the corresponding recesses of the work pallet 4 so as to fix the workpiece pallet 4 on the pallet-mounting part 12a. And the oil pressure for the work clamp 33 is put into the operative communication.

Then, the locking device 45 is disengaged, and the drive means 14 is actuated to rotate the rotary frame 12 by a half revolution so that the workpiece pallet 4 with the finished workpieces is moved into retracted position Y, and the workpiece pallet 4 with unfinished workpieces is moved to the pallet changing position X. After this rotation of the rotatable frame 12, locking device 46 is actuated again to lock the rotation of the rotatable frame, and at the same time the locating plugs 45 are disengaged from the pallet 4.

Then the workpiece pallet 4 loaded with unfinished workpieces is pushed on the travelling roller arrangement by the reciprocating system 82 to move it onto the pallet-positioning device 2. At this point, the clamp members of clamp system 10 are loosely fitted in the T-shaped grooves 35 of the workpiece pallet 4 and the guide rail 8 is fitted in the guide groove 36 to guide the travel of the workpiece pallet 4. The workpiece pallet 4 is stopped at the predetermined location by the engagement of engaging members 99 and the stops 11, and its position is fixed exactly by the fitting of locator plugs 7 into the corresponding recesses. It is further fixed on the supporting blocks 9 by actuation of the clamp system 10 to prepare for the machining operation.

The removal of chips from the workpiece pallet 4 with the finished workpieces is carried out by the chip-washing system W, while another workpiece pallet is installed to the pallet-positioning device 2. Then, the rotary frame 12 is rotated to return the workpiece pallet 4 with the finished workpieces to the pallet-changing position X and it is locked there. In this position, the work clamps 24 are loosened, and the finished workpieces are taken from the workpiece pallet 4. If any of the chips remain on the workpiece pallet 4 at this time, the empty workpiece pallet 4 will be turned downward again to wash the workpiece pallet 4 with the chip washing system W, and after the washing operation, the workpiece pallet 4 will be returned to the pallet-changing position X.

The same process will be repeatedly carried on hereafter.

The mechanical reciprocating system 82 may be omitted when the workpiece pallet 4 is moveable in a reciprocating manner by manual labor.

As shown in FIG. 9, one or more pallet-conveying bogies 47 may be installed for operation in front of pallet revolving system 3. In this case, each work pallet 4 is prepared by exchanging finished workpieces for unfinished ones 34 at a work-changing station which is disposed in some area within the factory, and are carried by means of the bogies 47, and transferred between the bogie 47 and the pallet revolving system 3.

Further, it is possible to carry a workpiece pallet 4 to and from the pallet-mounting part 12a located at pallet changing position X by means of a crane.

Moreover, it is possible to associate the pallet revolving system 3 and chip-washing system W with each automotive bogie which can then travel in front of a plurality of machine tool centers M, thereby using one pallet revolving system 3 and one chip-washing system W for all the centers. Further, a pallet revolving system 3 and a chip-washing system W are not necessarily installed in a stationary position in front of each machine tool M. These systems 3 and W may be installed on a mobile support which may move fore and aft for a predetermined distance so as to move them far forward of the pallet positioning device 2 when the rotatable frame 12 is rotated, and backward close to the pallet-positioning device 2 when the workpiece pallet 4 is transferred thereto or therefrom. This manner is more advantageous when the radius of revolution is large because of an increase in the size of the workpieces 34.

However, it is possible to increase the radius of revolution of the rotatable frame 12 even in case the pallet revolution system 3 is mounted in a stationary position, by locating the system 3 a little more remote from the machine tool M, and providing with one or more travelling rails or conveyor roller arrangements removably or connected by a hinge.

Furthermore, it is possible to dispose a plurality of pallet rotating systems 3 in front of one machine tool M in the manner to be described below, so as to exchange workpiece pallets 4 between these systems.

Figure 12:
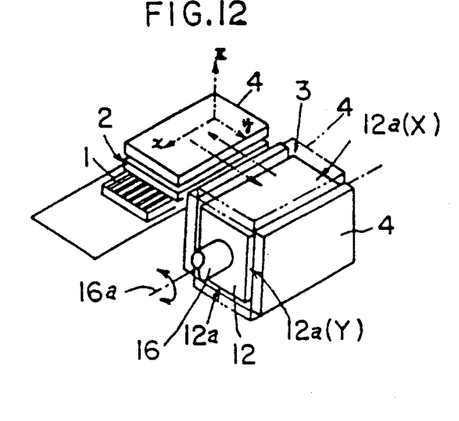
FIGS. 12 through 14 are schematic perspective views of important portions of the rotary frame employed in a second, third and fourth modified embodiments, respectively.

As shown in FIG. 12, with the pallet revolution system 3, it is possible to provide four pallet-mounting surfaces 12a on the peripheral surface of a frame 12 which is rotatable around the axis 16a by forming the section of the frame 12 square and fixing four individual workpiece pallets 4 on these pallet-mounting surfaces 12a. It is also possible to dispose five or six pallet-mounting surfaces 12a on a single rotatable frame 12 in the same manner.

If a large number of pallet-mounting surfaces 12a are disposed in a pallet-rotating system 3, it is possible to effect unmanned operation of machine tool center M for a long time, for example, throughout the night by the automatically changing work pallets between the pallet-positioning device 2 and the pallet rotating system 3.

Figure 13:
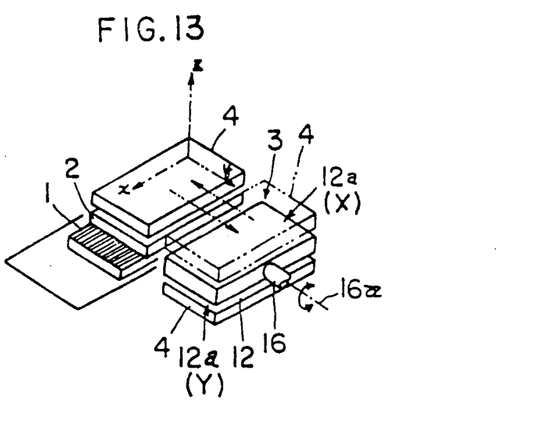
Figure 14:
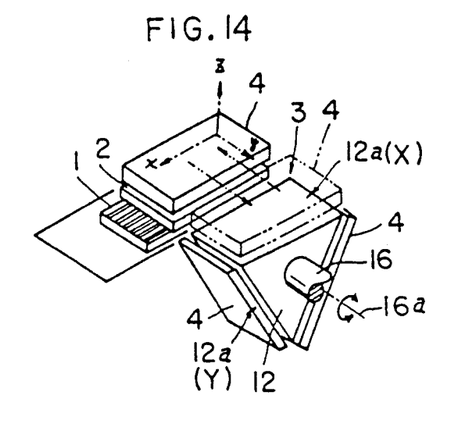

As shown in FIGS. 13 and 14, it is also possible to set the axis of revolution 16a of the rotatable frame 12 of the pallet rotating system 3 parallel with y axis in the coordinates of the machine tool center M. The system 3 shown in FIG. 13 has two pallet-mounting surfaces 12a on the rotatable frame 12, and the system 3 shown in FIG. 14 has three pallet-mounting surfaces 12a on the rotatable frame 12. In the same manner, the system 3 may have four, five or six pallet mounting surfaces.

In a second embodiment, shown in FIGS. 15-19, pallet-positioning device 2 comprises a pair of roller conveyors 48, locators 49, pull-type clamps 50, depression-type clamps 51 and supporting blocks 52 on the base plate 5.

Figure 18:
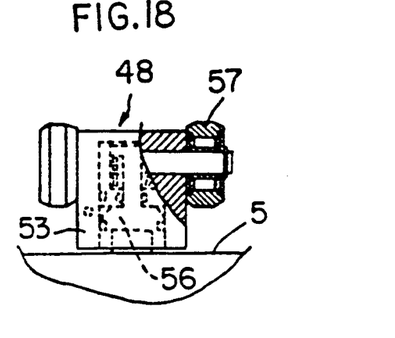
FIGS. 18 and 19 are enlarged vertical sectional front views, partly in section, of a preferred conveying roller arrangement.
Figure 19:
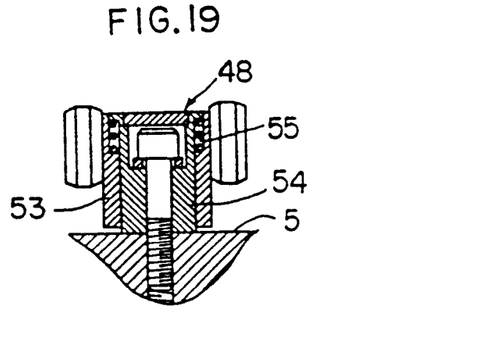
Figure 20:
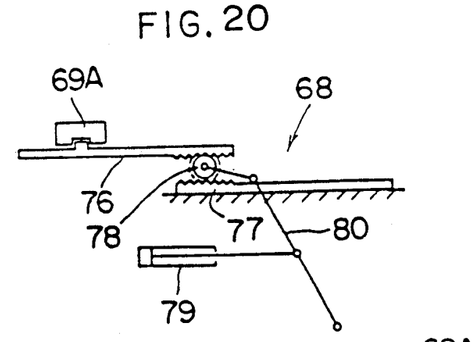
FIGS. 20 through 23 each designate push-pull mechanisms adapted for use in the second preferred embodiment.
Figure 21:
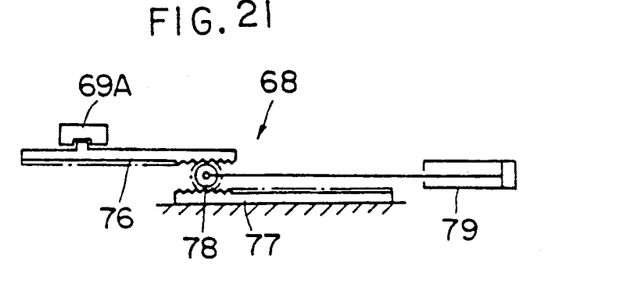
Figure 22:
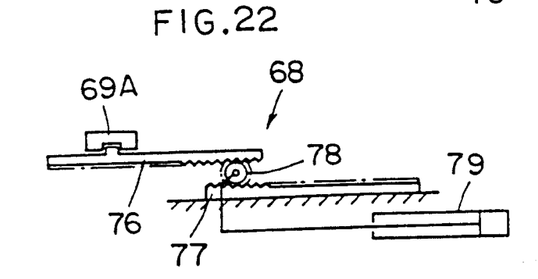
Figure 23:
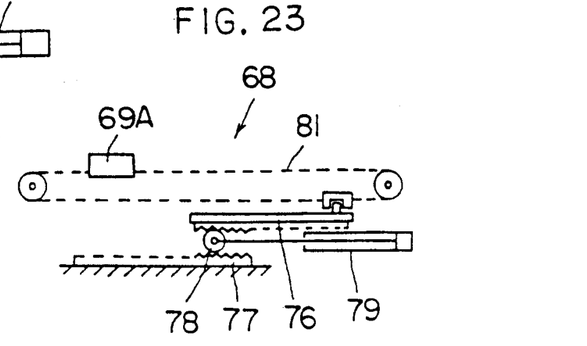
Figures 24, 25, 26, 27:
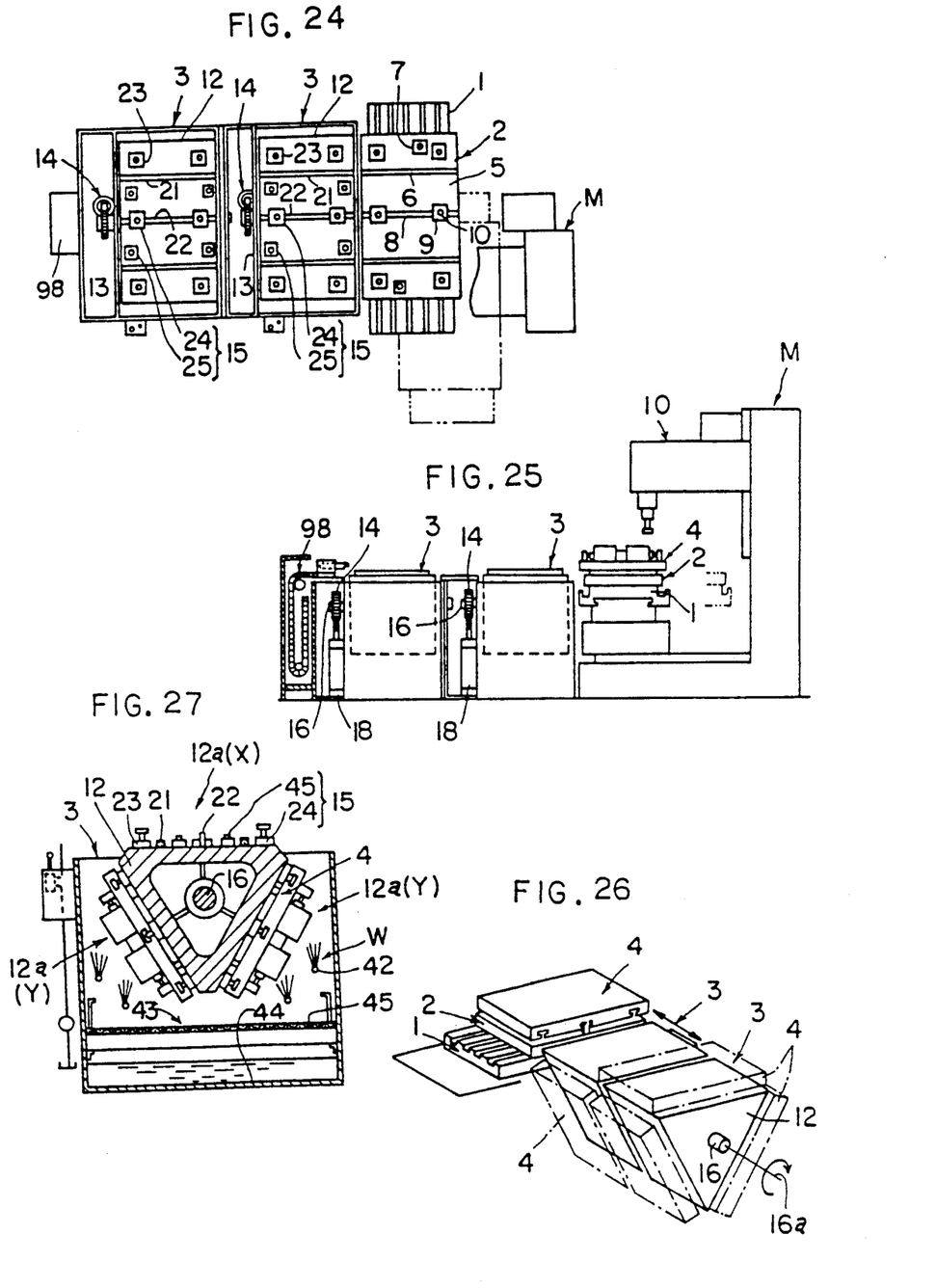
FIG. 24 is the plan view of the workpiece pallet changer employed.
FIG. 25 is a partially sectional side elevational view of the workpiece pallet changer of FIG. 24.
FIG. 26 is a somewhat schematic perspective view of the most significant portion of the apparatus shown in FIG. 24.
FIG. 27 is a vertical sectional side elevational view of the apparatus disclosed in FIGS. 24-26.

Each carry roller arrangement 48, as shown in FIGS. 18 and 19, comprises a roller support frame 53 urged downwardly by springs 55 with the respect to axial member 54, and hydraulic cylinders 56 urging the roller support frame 53 upward.

The free rollers 57 supported by the roller support frame 53 overhang it on the right and left sides thereof in order to prevent encroachment of chips into these rollers 57 by letting chips freely escape from the roller support frame 53 to either side.

Figure 17:
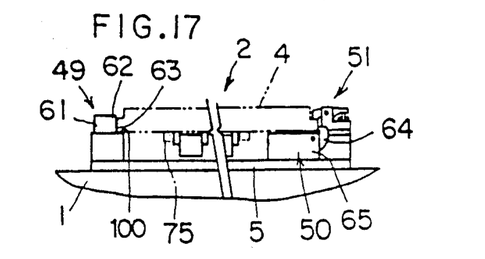
FIG. 17 is a front elevational view of a pallet positioning device used in the second preferred embodiment.

Each locator 49, as shown in FIG. 17, comprises a main body portion 61 and a contact member 62 mounted thereon and finely adjustable to the height of the receiving surface along the inclined surface of the body portion 61. Each pull-type clamp 50 has a clamp arm 64 which is swung outwardly by a hydraulic cylinder from a retracted position below the top surface of the body 64 so as to push the workpiece pallet 4 toward the locators 49 in order to locate it exactly. The depression-type clamps 51 pushes down on the installed workpiece pallet on the same side as pull-type clamp 50 is disposed, that is, the right side of FIG. 17.

A workpiece pallet 4 is transferred while the roller support frame 53 is elevated, and is then fixed on supporting blocks 52 and supporting part 100 of the locator 49 by clamps 50, 51 after the roller support frame 53 is brought down. Numeral 75 in the FIG. 14 designates one of the guide members.

Figure 15:
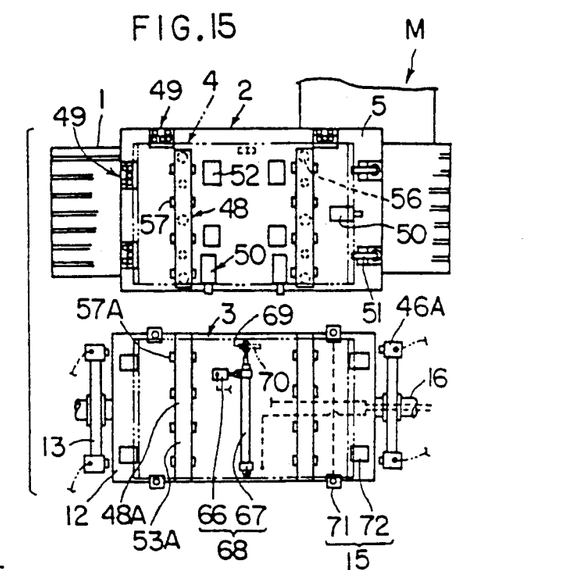
FIG. 15 is a plan view of the significant portions of the workpiece pallet changer.

In FIG. 15, two lines of conveyor roller arrangements 48A, a reciprocating system 68 and an engaging system 15 are disposed on each pallet-mounting surface 12a of rotatable frame 12 of pallet-rotating system 3.

Each roller conveyor 48A comprises a roller support from 53A fixed on the rotatable frame 12 and free rollers 57A supported thereon. Each roller conveyor 58 serves as a support for the workpiece pallet 4 on each pallet-mounting surface 12a.

The reciprocating system 68 comprises a three-stage telescopic hydraulic cylinder 67, a hydraulic cylinder 66 to operate cylinder 67 and an engaging part 69. This engaging part 69 is adapted to engage with a corresponding engaging member 70 disposed beneath the work pallet 4 while the work pallet 4 is pushed into or pulled from the pallet-positioning device 2, and is disengaged from the engaging member 70 when the cylinder 66 pulls cylinder 67 to the left. This reciprocating system 68 may be disposed at right and/or left side part of each pallet mounting surface 12a.

The reciprocating system 68 may be modified in various ways. For example, it can comprise drive rollers disposed on carry roller conveyor arrangements 48, 48A, instead of free rollers 57, 57A, and electric, pneumatic or hydraulic motors to drive these rollers forward or reverse by chains or other means of transmission. Further, one of the mechanisms individually shown in FIGS. 20 to 23 may be adapted to drive the member 69A corresponding to the engaging part 69 forward or reverse. In these figures, numerals 76, 77 designate racks; 78 designates a pinion; 79 designates a hydraulic cylinder; 80 designates a link; and 81 designates a chain or wire.

Figure 16:
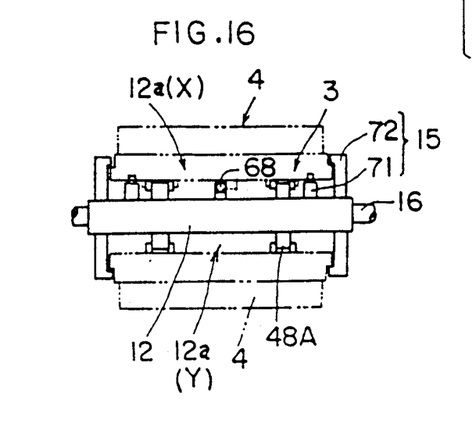
FIG. 16 is a front elevational view of the portions shown in FIG. 15.

The engaging system 15 shown in FIGS. 15 and 16 comprises engaging pin devices 71 and right and left connecting hooks 72. The hooks 72 do not disturb the backward and forward motion of the workpiece pallet 4, but they restrict the motions of the workpiece pallet 4 to the right, left, up and down. Each engaging pin device 71 comprises an engaging pin and a hydraulic cylinder to elevate the pin so as to prevent the workpiece pallet from sliding off of the pallet mounting surface 12a when inclined by the rotation of the rotatable frame 12, with an elevated engaging pin.

A locking device 46 comprises lock pins disposed on the piston rods of each hydraulic cylinder to urge them into recesses formed on the end surfaces of the rotary frame.

In a third preferred embodiment (FIGS. 24–27), two pallet rotating systems 3 as described with respect to the first two preferred embodiments are disposed in front of the machine center M, and a reciprocating system 98 of chain-drive type for transferring the workpiece pallet between each pallet rotating system 3 and pallet-positioning device 2 is disposed at the pallet rotating system 3 located farthest from the machine center M. This reciprocating system 98 is similar in construction to the reciprocating system 82 described in connection with the first preferred embodiment, but a chain is used instead of a steel belt, and rails which guide the chain are disposed on each pallet mounting surface and pallet positioning device.

Figures 28, 29:
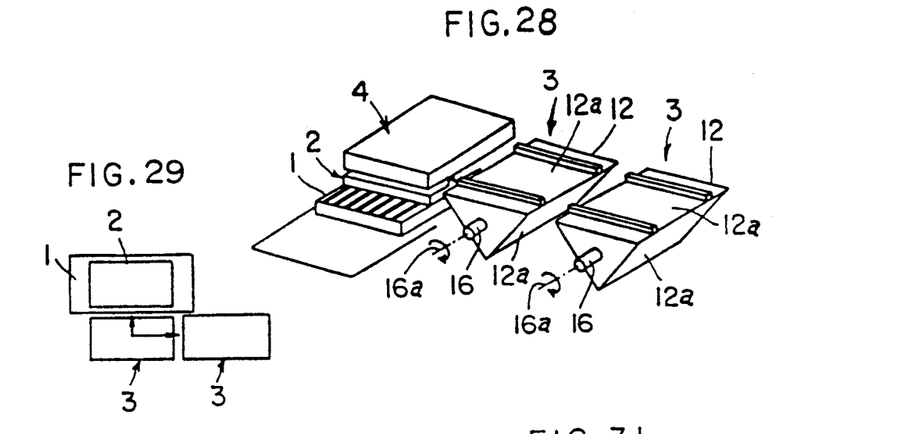
FIG. 28 is a perspective view of the significant portions of ,a first modification.
FIGS. 29 and 30 are schematic plan views of two other modifications.

In these figures, the axis of rotation 16a is directed fore and aft, but, as shown in FIG. 28, the device may be modified to direct the axis 16a from right to left. The rotating frame 12, as shown in FIG. 4 or 12, may be shaped as a thick plate or a square column instead of triangular column. The two pallet rotating systems 3 shown in FIG. 29, may also be disposed from right to left, or, as shown in FIG. 30, more than three pallet rotating systems 3 may be used, disposed first from left to right, and then from rear to front.

Other Preferred Embodiments

In the preferred embodiments described above, in order to change workpiece pallets 4 automatically between the pallet rotating systems 3 and the pallet positioning device 2, commands or signals may be exchanged between the control means of machine center M and that of workpiece pallet changer, and the systems and devices provided for pallet rotating system 3 and pallet fixing devices 2 may be controlled by the later control means in accordance with a predetermined sequence. In this case, sensing means for sensing the location of the workpiece pallet 4 or for sensing the posture of rotating frame 12 are disposed as needed and the signals generated thereby are sent to these control means.

Moreover, the workpiece pallet changer according to the present invention may be adapted to not only a vertical machine tool provided with vertical main spindle, but also to horizontal machine tool provided with horizontal main spindle. In either case, the workpiece pallet changer may be installed not only in front of the table 1 of the machine tool, but at other sides of the table.

The workpiece pallet changer according to the present invention may be adaptable not only to machine centers but also to vertical or horizontal machine tools of various sorts such as milling machines, planers, shapers, boring machines, drilling machines, and so on.

What is claimed is:

1. A work pallet changer for a machine tool comprising a pallet fixing device on a work table receiving a work pallet on said pallet fixing device, a pallet shift system disposed adjacent said machine tool, a plurality of pallet mounting parts disposed in said pallet shift system and means for changing the position of each pallet mounting part between a pallet changing position located adjacent said pallet fixing device and a pallet retracted position spaced from said pallet changing position so as to enable transfer of a work pallet between one of said pallet mounting parts located at said pallet changing position and said pallet fixing device, and wherein: said pallet shift system further comprises at least one pallet rotating system including:

- a rotary frame having a plurality of non-radially extending peripheral surfaces for receiving respectively said pallet mounting parts disposed on said peripheral surfaces of said rotary frame at spaced locations from each other,
- a supporting frame which supports said rotary frame rotatable around an axis of rotation, driving means for rotating said rotary frame around said axis,
- a plurality of pallet engaging means respectively disposed on said pallet mounting parts, so as to engage each work pallet on each pallet mounting part thereby, wherein said pallet engaging means defines a path of entrance to and exit from the pallet mounting part to the pallet fixing device wherein the travel axis of the path is generally perpendicular to the axis of rotation.

2. The work pallet changer for a machine tool recited in claim 1, wherein: said axis is disposed generally horizontally to pass through a center of said rotary frame.

3. The work pallet changer for a machine tool recited in claim 1, wherein:
said rotary frame is plate shaped and each pallet mounting part is individually disposed on the top and the bottom surfaces thereof.

4. The work pallet changer for a machine tool recited in claim 1, wherein:
said rotary frame is formed as a column having an equilateral triangular cross-section and each pallet mounting part 12a is disposed on each peripheral planar surface thereof.

5. The work pallet changer for a machine tool recited in claim 1, wherein:
said rotary frame has a square cross-section and each pallet mounting part is disposed on each peripheral planar surface thereof.

6. The work pallet changer for a machine tool recited in claim 1, wherein: said pallet shift system further comprises a push-pull system which serves to transfer said work pallet between a pallet mounting part located at the pallet changing position and said pallet fixing device, said push-pull system having a driving means disposed outside said rotary frame.

7. The work pallet changer of claim 1, wherein a pallet mounting part on the rotary frame in the pallet changing position is generally horizontally coplanar with the pallet fixing device on the work table.

8. The work pallet changer of claim 1, further comprising a plurality of said machine tools positioned at spaced locations from each other, and means for moving said pallet rotating system to selected ones of said machine tools.

9. The work pallet changer of claim 1, wherein said rotary frame is provided with a chip washing system thereunder facing upwardly towards said rotary frame, said chip washing system mounted substantially vertically below a pallet mounting part in said retracted position.

10. The work pallet changer of claim 1, wherein said supporting frame supports said rotary frame rotatable about a generally horizontal axis of rotation, said horizontal axis extending generally parallel to and between the pallet mounting parts of the rotary frame when the pallet mounting parts are in the pallet changing position and the pallet retracted position, respectively.

11. The work pallet changer of claim 1, further including means for (1) clamping unfinished workpieces to a workpiece pallet on a pallet mounting part on the rotary frame in the pallet changing position, which is generally coplanar with the pallet fixing device, when finished workpieces on another workpiece pallet on the rotary frame are in the pallet retracted position, and (2) transferring finished workpieces and the associated pallet from the pallet fixing device to a pallet mounting part on the rotary frame in the pallet changing position when said pallet mounting part containing clamped unfinished workpieces is in the pallet retracted position.

12. The work pallet changer of claim 1, wherein transfer of the work pallet along the path occurs at an uppermost position of the pallet mounting part on the rotary frame.

13. The work pallet changer of claim 12, wherein said path extends in a generally horizontal plane.

* * * * *